United States Patent [19]

Komiya et al.

[11] Patent Number: 4,986,948
[45] Date of Patent: Jan. 22, 1991

[54] MOLDING PROCESS FOR FIBER REINFORCED PLASTICS

[75] Inventors: Kiyoshi Komiya, Mishima; Yoshimasa Nakamura, Ikeda, both of Japan

[73] Assignee: Takeda Chemical Industries, Ltd., Osaka, Japan

[21] Appl. No.: 342,598

[22] Filed: Apr. 24, 1989

Related U.S. Application Data

[63] Continuation of Ser. No. 134,080, Dec. 17, 1997, abandoned.

[30] Foreign Application Priority Data

Dec. 19, 1986 [JP] Japan .................. 61-305002

[51] Int. Cl.⁵ .............................. B29C 45/14
[52] U.S. Cl. .................. 264/257; 264/276; 264/294
[58] Field of Search ............. 264/257, 259, 266, 276, 264/153, 163; 425/112, 129.1

[56] References Cited

U.S. PATENT DOCUMENTS

| | | | |
|---|---|---|---|
| 2,797,179 | 6/1957 | Reynolds et al. | 264/257 |
| 4,075,266 | 2/1978 | Theysohn | 264/259 |
| 4,834,933 | 5/1989 | Gardner et al. | 264/257 |

FOREIGN PATENT DOCUMENTS

| | | | |
|---|---|---|---|
| 186015 | 7/1986 | European Pat. Off. | 264/163 |
| 3444921 | 9/1985 | Fed. Rep. of Germany | 264/257 |
| 60-252758 | 12/1985 | Japan | 264/257 |
| 62-117730 | 5/1987 | Japan | 264/257 |

Primary Examiner—Jan H. Silbaugh
Assistant Examiner—Catherine Timm
Attorney, Agent, or Firm—Wenderoth, Lind & Ponack

[57] ABSTRACT

A molding process of fiber reinforced plastics which includes:
placing fiber reinforcements on a half of a mold which has positive pinch-off edges:
positioning the mold halves near to each other to grasp the fibers between the pinch-off edges;
injecting a resin into a mold cavity through a resin injection opening provided in the mold; and
closing the mold. This process permits the use of low viscosity resins without the escape of the resin from the mold during the impregnation of fiber reinforcements in the mold cavity, so that the process can readily produce in practical manners fiber reinforced plastics with high fiber contents as much as about 50-80% by weight that have not been achieved by the conventional resin injection and mat or preform matched die molding processes.

5 Claims, 3 Drawing Sheets

MOLDING PROCESS FOR FIBER REINFORCED PLASTICS

This application is a continuation of now abandoned application Ser. No. 07/134,080, filed on Dec. 17, 1987.

This invention relates to a molding process of fiber reinforced plastics which is capable of producing at high production rates fiber reinforced plastics having larger contents of reinforcing fibers and thus having an enhanced mechanical strength than the conventional fiber reinforced plastics.

Flash molds are generally used in resin injection molding or resin transfer molding process. In this molding process, reinforcing fibers are first placed on a half of a mold having elastic packings on the mating surfaces, the mold is closed or clampled, a resin is injected into a mold cavity through a resin injection opening under a pressure to impregnate or wet the fibers therewith, and the resin is cured, thereby to provide fiber reinforced plastics.

In this molding process, the reinforcing fibers are first placed in a mold cavity, and after the mold is closed, a resin is injected into the mold cavity. Therefore, the resin must be injected into a mold cavity under a large pressure even when the resin has a low viscosity, and the larger the fiber contents in the resultant composites, the larger the pressures needed. However, even when low viscosity resins are used, it is difficult to distribute the resin equally throughout the entire fibers in the mold cavity since the mold is closed.

As is well known in the art, therefore, when, for example, unsaturated polyester resins reinforced with glass fiber chopped strand mats as fiber reinforcements are molded by use of fiber reinforced resin molds, the fiber content is usually about 30% by weight at most. Even when a combination of glass roving cloths and chopped strand mats is used, the fiber content is usually in the range of about 40-45% by weight at most. If there be used molds with a higher strength and resin injection apparatus with a larger injection pressure, fiber reinforced plastics having a higher fiber content would be obtainable from the theoretical standpoint. However, no such processes have heretofore been put to practical use because of technical and economical problems involved. The higher the fiber contents in fiber reinforced plastics, the greater the mechanical strength of the composites, however, the conventional resin injection molding process has failed to incorporate fiber reinforcements into composites to the allowable limits.

On the other hand, mat or preform matched die molding process uses mats or preforms which have been preliminarily prepared with reinforcing fibers so as roughly to have forms of final products. In this process the mat or preform is first placed on a mold half, a resin is spread on the mat or preform, and then the preheated mold is closed so that the resin cures. This process has also a disadvantage in that when a low viscosity resin is spread on mats or preforms deposited on a core, the resin escapes from the mold before the mold is closed. Therefore, the process usually uses such resins as mixed with additives and having an increased viscosity. However, this makes it difficult to produce fiber reinforced plastics having high fiber contents compared with the processes where low viscosity resins are used. Furthermore, fiber reinforced plastic composites produced by the mat or preform matched die molding process contain fibers usually in amounts of about 30% by weight at most when glass fiber chopped strand mats are used as fiber reinforcements.

The mat or preform matched die molding process has a further disadvantage from the environmental standpoint in that resins are scattered around molding equipments and give out a bad smell, in contrast to processes in which resins are injected into a closed mold cavity.

As set forth above, the conventional resin injection molding and mat or preform matched die molding processes are not suitable for the production of fiber reinforced plastics with fiber content and strength increased to the allowable limits at high production rates.

The present inventors have made extensive investigations to establish a process which enables the production of fiber reinforced plastics which have increased fiber contents and enhanced mechanical strength with a high productivity by combining the conventional resin injection molding and mat or preform matched die molding processes together into a new integrated process in which the use of a mold which has positive pinch-off edges provided thereon is essentially important.

It is, therefore, an object of the invention to provide a molding process of fiber reinforced plastics, particularly a molding process which enables the production of fiber reinforced plastics with high fiber contents and hence high mechanical strength at high production rates which the conventional molding processes have failed to achieve.

The molding process of fiber reinforced plastics of the invention comprises:

placing fiber reinforcements on a lower half core of a mold which has positive pinch-off edges;

positioning the mold halves near to each other to grasp the fibers between the pinch-off edges;

injecting a resin into a mold cavity through a resin injection opening provided in the mold; and closing the mold.

Other and further objects, features and advantages of the invention will appear more fully from the following description taken in connection with the accompanying drawings, wherein.

Figure 1:
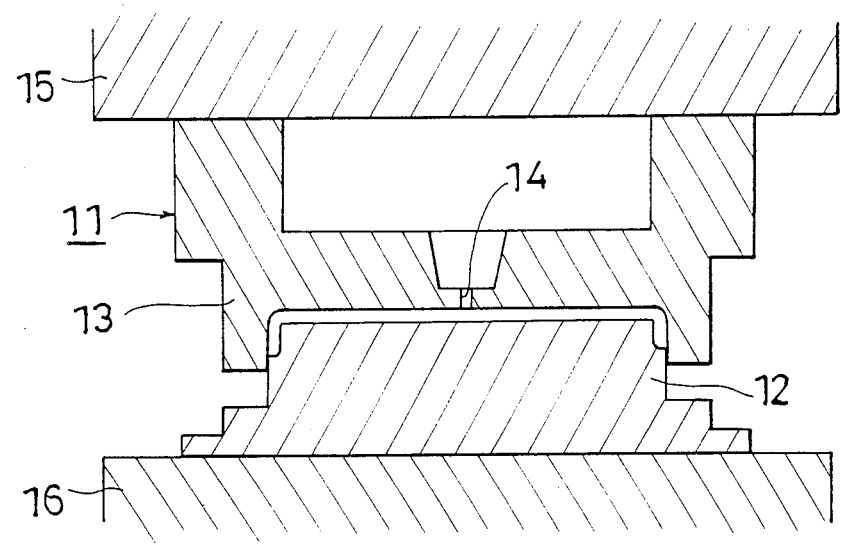
FIG. 1 is a sectional view of an example of a mold used in the process of the invention.
Figure 2:
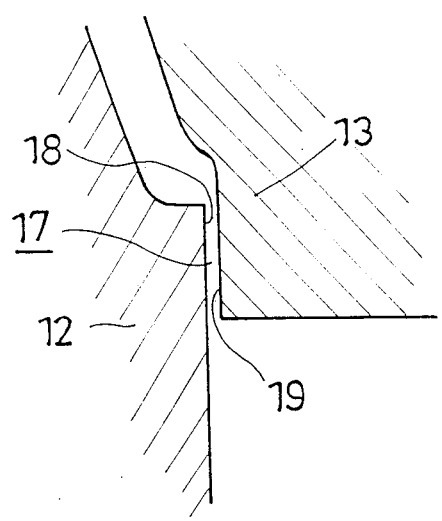
FIG. 2 is an enlarged sectional view of engaging positive pinch-off edges formed on the mold.

Referring first to FIG. 1, there is shown a sectional view of an example of a mold 11 used in the invention, which includes a core 12 and a cavity 13 having a resin injection opening 14 therethrough. In the figure, the mold is closed between mold platens 15 and 16 operated by a hydraulic press (not shown). The mold has positive pinch-off edges. FIG. 2 is an enlarged sectional view of an example of such positive pinch-off edges 17 under engagement with a clearance therebetween. The pinch-off edges are formed by cooperation of surface portions 18 including an edge on the core 12 and surface portions 19 including an edge of the cavity 13 of the mold.

Molds used in matched die molding procesess are provided with such positive pinch-off edges, and such molds are usable in the process of the invention. The travel of the pinch-off edges depends upon the volume of fiber reinforcements deposited in a mold, however, it is usually in the range of about 2–30 mm, preferably in the range of about 3–10 mm. The clearance between the pinch-off edges is preferably in the range of about 0.05–0.15 mm.

Figure 3:
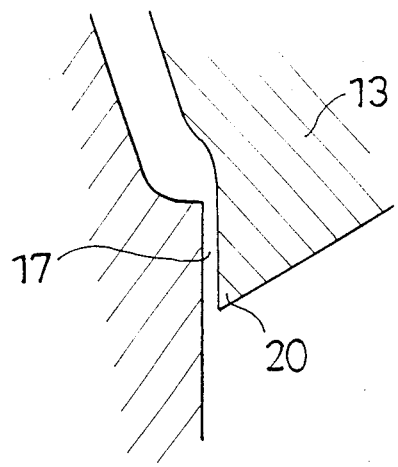
FIG. 3 is also an enlarged sectional view of another type of pinch-off edges.

FIG. 3 shows an enlarged sectional view of another type of pinch-off edges 17, and the cavity 13 has a pinch off edge with a blade 20 at the end.

Figure 4:
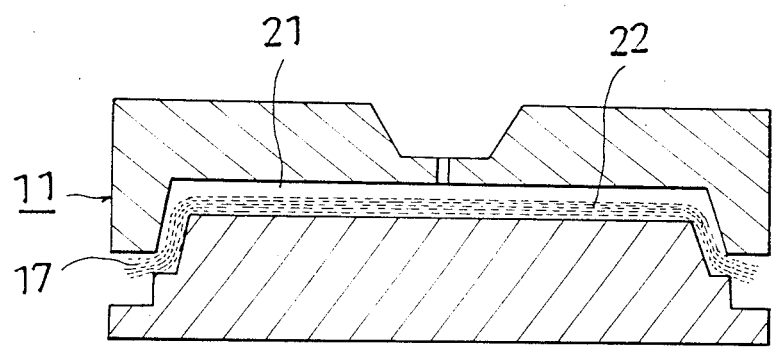
FIG. 4 illustrates two halves of a mold positioned near to each other to grasp the reinforcing fibers between the pinch-off edges.

According to the process of the invention, when resins are injected into a mold cavity 21 and distributed therein, the mold halves are positioned near to each other, as illustrated in FIG. 4, so that the pinch-off edges 17 grasp the fibers 22 therebetween to prevent the escape of the resins from the mold 11 through the fibers The mold may be of metals or resins, and the former is preferred when fiber reinforced plastics are mass-produced. The shape of molds used is designed in accordance with the shape of final products.

Fiber reinforcements usable in the invention include those which are used in the production of ordinary fiber reinforced plastics, and such fibers are exemplified by inorganic or metal fibers such as glass fibers, carbon fibers, quartz fibers, ceramic fibers, zirconia fibers, boron fibers, tungsten fibers, molybdenum fibers, steel fibers, beryllium fibers or stainless steel fibers, and synthetic fibers such as polyamide fibers or polyester fibers. The fiber reinforcements may be treated with a coupling agent to improve adhesion to resins.

Further, the fibers may be used alone or in combination of two or more of the above, and may be in the form either of preforms, mats or cloths, or a combination of these forms. In the process of the invention, the fiber content in fiber reinforced plastics are dependent upon the viscosity of the resin used, fiber reinforcements and their forms, and requisites to final products needed, and is usually in the range of about 5–80% by weight, preferably in the range of about 50–70% by weight based on the fiber reinforced plastics.

According to the process of the invention, reinforcing fibers are first deposited on a lower half of a mold, and then the mold halves are made to come near to each other and are positioned to grasp or catch hold of the fibers between the pinch-off edges so that the resins do not escape from the mold when the resins are injected onto the fibers in a mold cavity. In the process of the invention, as a means to drive the mold, a hydraulic press is usable which is normally used in compression molding of fiber reinforced plastics. It is preferred that the hydraulic press has position control attachments to first position the mold halves near to each other, and then to drive and close the mold.

It is essential in the process of the invention that the mold halves are positioned so that the pinch-off edges grasp therebetween the fibers in the mold, not allowing resins to escape from between the pinch-off edges when the resins are injected into a mold cavity to impregnate the fibers therein.

Figure 5:
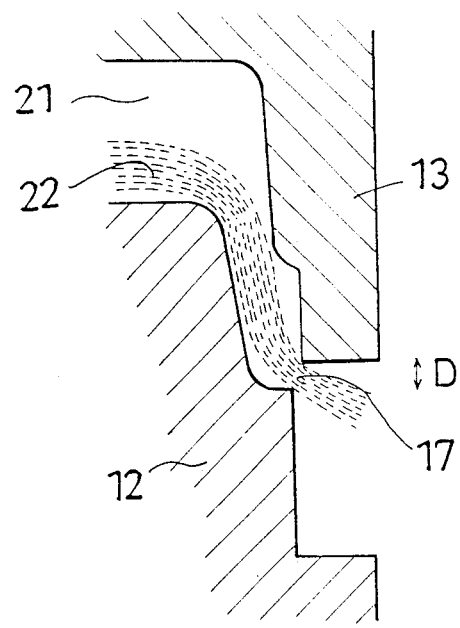
FIG. 5 is an enlarged sectional view of an example of unengaging pinch-off edges.

FIG. 5 illustrates a preferred position of pinch-off edges 17 to grasp fiber reinforcement therebetween. The pinch-off edges have a distance D between the edge of a core 12 and the edge of a cavity 13 of a mold. The distance D is selected depending upon the volume or thickness of fiber reinforcements 22 deposited on a core 12, but is usually in the range of about 0–5 mm. The fiber reinforcements in a mold cavity 21 extends beyond the pinch-off edges 17 and are grasped therebetween at the end portions. This position is preferred since resins are readily injected into a mold cavity under a low pressure while the escape of the resins through the fiber reinforcements is prevented at the pinch-off edges. The fiber reinforcements are generally voluminous, and especially glass fiber reinforcements are the case, so that it is not necessary to grasp the fiber reinforcements firmly between the pinch-off edges if the escape of the resins is prevented at the pinch-off edges.

However, the pinch-off edges may be either slightly or deeply engaged with each other (depending upon the volume or thickness of fiber reinforcements on a core) over a distance usually of about 0–1 mm, to cut off the fiber reinforcements extending beyond the mold provided that the mold has not been completely closed, as shown in FIGS. 2 and 3.

Then resins are injected onto the fibers in a cavity under a pressure usually of several kg/cm$^2$. Any means may be utilized for the resin injection, such as pumps or normal injector used in reaction injection molding process.

The process of the invention is applicable to any resin which is usable in the production of ordinary fiber reinforced plastics. However, thermosetting resins are preferred, such as unsaturated polyester resins, vinyl ester resins, epoxy resins, polyurethane resins, polyimide resins, phenol resins, silicone resins, cross-linkable polyesteramide resins, cross-linkable polyaminoamide resins, cross-linkable epoxymodified polyaminoamide resins or cross-linkable polyetheramide resins.

The unsaturated polyester resins are, as well known, a liquid mixture of unsaturated alkyds and vinyl monomers. The unsaturated alkyds are obtained by polycondensation of polybasic carboxylic acids such as phthalic anhydride, isophthalic acid, maleic anhydride or fumaric acid, with glycols such as ethylene glycol or propylene glycol, whereas the vinyl monomers are exemplified by styrene. The unsaturated polyester resins are superior in moldability, and widely used as matrices of fiber reinforced plastics. Epoxy resins and epoxy modified vinyl ester resins are superior to the unsaturated polyester resins since the former two resins have higher mechanical strength and smaller cure shrinkage than the unsaturated polyester resins are also widely used as matrices. Most of the epoxy resins used are fast curable bisphenol A type epoxy resins. Polyurethane resins produced by the reaction of polyisocyanates and polyols are also rapidly curable and are one of the preferred matrices.

One of the most preferred cross-linkable resins used in the process of the invention is cross-linkable polyamide resins such as polyesteramide resins obtained by the reaction of 2,2'-(1,3-phenylene)bis-2-oxazoline with reactants such as dibasic carboxylic acids, aromatic hydroxy carboxylic acid, carboxylic acid anhydrides, e.g., adipic acid, sebacic acid, phthalic acid, salicylic acid, p-hydroxybenzoic acid or phthalic anhydride, or a mixture of two or more, preferably in the presence of catalysts such as phosphorous acid, as disclosed in U.S. Pat. No. 4,474,942, No. 4,579,937 and No. 4,600,766. The cross-linkable polyamide resins usable in the invention further include polyaminoamide resins obtained by the reaction of 2,2'-(1,3-phenylene)-bis-2-oxazoline with diamine compounds such as diaminodiphenylmethane in the presence of catalysts, epoxy modified cross-linkable polyaminoamide resins obtained by the reaction of 2,2'-(1,3-phenylene)-bis-2-oxazoline with diamine compounds and epoxy resins, and polyetheramide resins obtained by the reaction of 2,2'-(1,3-phenylene)bis-2-oxazoline with phenolic compounds or polymers.

In the process of the invention, the resins may be used either as one-component, two-component or three-component systems. When used as one-component systems, a mixture of base resins and curing agents are prepared in a tank, and the mixture is injected into a mold cavity. When used as two-component or three-component systems, base resins and curing agents are separately stored in tanks and injected into a mold cavity through a mixing means.

The resins may contain catalysts, stabilizers, parting agents, colorants, fire-retardants or fillers depending upon the resins used and requisites to the resultant fiber reinforced plastics. The process of the invention is suitable for high rate production of fiber reinforced plastics by use of fast curable resins. Further, when fiber reinforced plastics with high fiber contents are to be produced, it is desired to use resins which have a relatively low viscosity of not more than about 1500 cps (centipoise) when being injected into a mold cavity so that the fibers are readily wetted and impregnated therewith.

It is especially desired that resins are as low in viscosity as not more than about 1000 cps, and most preferably the resins have a viscosity of about of 10–300 cps at temperatures at which the resins are injected into a mold cavity to obtain fiber reinforced plastics with fiber contents as much as about 50–80% by weight based on the fiber reinforced plastics. It is also desired, however, that the resins used generate no cracks during curing if the resins contain no fillers so that they have a low viscosity.

According to the process of the invention, the mold is closed by driving a mold half by means of a hydraulic press while the other half is fixed after the resins have been injected into a mold cavity. No heating is necessary when thermoplastic resins are used, but when cross-linkable resins are used, the mold is preheated usually at temperatures of about 100°–250° C. The molding pressures are usually in the range of about 10–50 kg/cm$^2$, and the cycle times are usually in the range of about 30 seconds to about 30 minutes, although the molding pressures and cycle times being not critical and varying depending upon the resins, catalysts or fiber reinforcements used, or thickness of the resultant composites.

As set forth above, according to the invention, reinforcing fibers are first deposited in a mold, the mold halves are positioned near to each other to grasp the fibers between the pinch-off edges, and then resins are injected into a mold cavity while the mold cavity still has a wide space since the mold has not yet been closed completely. Therefore, the resins can be injected into the mold under a very low pressure, while no escape of the resins from the mold takes place if low viscosity resins are used, since the fibers are grasped between the pinch-off edges of the mold to prevent the escape of the resins from the mold through the fibers.

This use of such low viscosity resins enables ready and thorough impregnation of the fiber reinforcements with the resins under low pressures, so that the process of the invention can readily produce in practical manners fiber reinforced plastics with high fiber contents as much as about 50–80 % by weight that have not been achieved by the conventional resin injection and mat or preform matched die fiber reinforced plastics molding processes. As a further aspect, the process of the invention is superior to the conventional molding processes such as the mat or preform matched die molding process from environmental standpoint in that there arises substantially no problem of resin scattering or bad smell.

Furthermore, the use of low viscosity resings permits the use of much smaller capacity hydraulic presses in this molding process than in the compression molding process wherein sheet molding compounds or bulk molding compounds are molded.

In this way, fiber reinforced plastics with much higher fiber contents and much higher mechanical strengths are readily produceable with high production rates according to the process of the invention than in the conventional resin injection molding and mat or preform matched die molding processes.

The invention will be understood more readily in reference to the following examples, however, these examples are intended to illustrate the invention only, and are not to be construed as limitings to the invention.

EXAMPLE 1

Using cross-linkable polyesteramide resins and glass fibers, fiber reinforced plastic trays were produced in a testing mold having pinch-off edges as shown in FIGS. 1 and 2 provided with a resin injector used in reaction injection molding and an up-stroke hydraulic press to drive the lower half of the mold.

Preparation of Resins

An amount of 8.25 kg of 2,2'-(1,3-phenylene)bis-2-oxazoline, 1.11 kg of p-hydroxybenzoic acid and 0.64 kg of salicylic acid were weighed respectively and dry blended with each other. The mixture was placed in a tank A heated at about 150° C. and stirred to form a melted liquid.

An amount of 2.6 kg of 2,2'-(1,3-phenylene)bis-2-oxazoline, 1.85 kg of salicylic acid, 5.55 kg of sebacic acid and 0.75 kg of phosphorous acid were weighed respectively, and dry blended together. The mixture was placed in a tank B heated at about 150° C. and stirred to form a melted liquids.

Then the temperature of both the liquids was adjusted to 140° C. The liquids in the tank A and B were found about 40 cps and about 50 cps at 140° C., respectively, by Brookfield type viscometers. The mixing ratio of the liquid A to B was adjusted to 80/21.5 in weight, and the discharge amount to 123 g/sec, with discharge pressures of A and B about 70 kg/cm$^2$ and about 140 kg/cm$^2$, respectively.

Molds and Hydraulic Presses Used

The mold used had pinch-off edges with a travel of 5 mm and a clearance therebetween of 0.1 mm, as shown in FIG. 2, and a mold cavity of 40 cm in length, 27 cm in width, 2 cm in depth and 3 mm in thickness. A mixing head of a resin injector used in reaction injection molding was mounted on the top half of the mold to inject the resin into the mold cavity.

The mold was heated with electric heaters inserted thereinto so that the surface of the mold had a temperature of 200° C. Then the mold was opened, and a parting agent, wax, was coated on the surface of the mold.

Molding

Continuous strand mats (M 8609 by Asahi Fiber Glass K. K., Japan, 450 g/m$^2$, about 47 cm in length and about 34 cm in width) were deposited in eight layers on the core of the mold, and then the lower half of the mold was moved upwards so that the pinch-off edges had a distance D of about 2 mm therebetween, as shown in FIG. 5.

The resin injector was operated for 2.2 seconds to inject the resin into the mold through an impingement mixing means. The calculated discharge amount was 270 g. Immediately after the injection, the lower half of the mold was moved upwards at a rate of about 0.5 mm/sec until the mold halves came into contact with each other at spacers on the lands, and thus the mold was completely closed.

After two minute heating under a pressure of about 30 kg/cm$^2$, the mold was opened and the resultant tray was taken out of the mold. The tray was found 2.84 mm in average thickness. The tray was cut into test pieces and the properties were measured according to JIS methods. The results are shown in Table 1.

EXAMPLE 2

The same continuous strand mats as in Example 1 were placed in ten layers, and otherwise in the same manner as in Example 1, fiber reinforced plastic trays were produced. The properties are shown in Table 1.

EXAMPLE 3

In place of the continuous strand mats as used in Example 1, there were used glass fiber reinforcements composed of two layers of unidirectional glass roving cloth (REW 650 X-HM by Nippon Glass Sen-i K. K., Japan) as both of the surface layers, and the same continuous strand mats as used in Example 1 in three layers as middle layers, and otherwise in the same manner as in Example 1, fiber reinforced plastic trays were produced. The properties are shown in Table 1.

TABLE 1

| | Testing Methods | Examples 1 | 2 | 3 |
|---|---|---|---|---|
| Fiber Content (wt %) | JIS K 7052 | 63.8 | 71.7 | 72.3 |
| Tensile Strength (kgf/mm$^2$) | JIS K 7113 | 26.9 | 27.5 | 41.4 |
| Tensile Modulus (kgf/mm$^2$) | JIS K 7113 | 1900 | 1950 | 3010 |
| Flexural Strength (kgf/mm$^2$) | JIS K 7055 | 44.5 | 50.4 | 136.9 |
| Flexural Modulus (kgf/mm$^2$) | JIS K 7055 | 1700 | 2090 | 4210 |
| Compression Strength (kgf/mm$^2$) | JIS K 7056 | 40.1 | — | 46.3 |
| Compression Modulus (kgf/mm$^2$) | JIS K 7056 | 1650 | — | 3230 |

What is claimed:

1. A molding process for forming an article of fiber reinforced plastics which comprises: carrying out in sequence, the steps comprising:

placing fiber reinforcements on one half of a mold having two mold halves defining a mold cavity and which has positive pinch-off edges, the fiber reinforcements being deposited in amounts of about 50–80% by weight based on the resultant fiber reinforced plastics;

positioning the mold halves near to each other yet not completely closing the mold to grasp the fibers between the pinch-off edges so that resin does not escape from the mold through the fiber reinforcements while resin is injected into the mold cavity and distributed therein;

injecting a resin which has a viscosity of not more than about 1500 cps into the mold cavity of the mold halves thus positioned through a resin injection opening provided in the mold, thereby enabling ready and thorough impregnation of the fiber reinforcements; and closing the mold and thereby applying molding pressure to form the article.

2. The method as claimed in claim 1 wherein the resin has a viscosity of about 10–300 cps.

3. The method as claimed in claim 1 wherein the resin is cross-linkable polyamide resins.

4. The method as claimed in claim 3 wherein the cross-linkable polyamide resins are cross-linkable polyesteramide resins, cross-linkable polyaminoamide resins, epoxy modified cross-linkable polyaminoamide resins or cross-linkable polyetheramide resins.

5. The method as claimed in claim 4 wherein the crosslinkable polyamide resins are obtained by the reaction of 2,2'-(1,3-phenylene)bis-2-oxazoline with reactants.

* * * * *